UNITED STATES PATENT OFFICE.

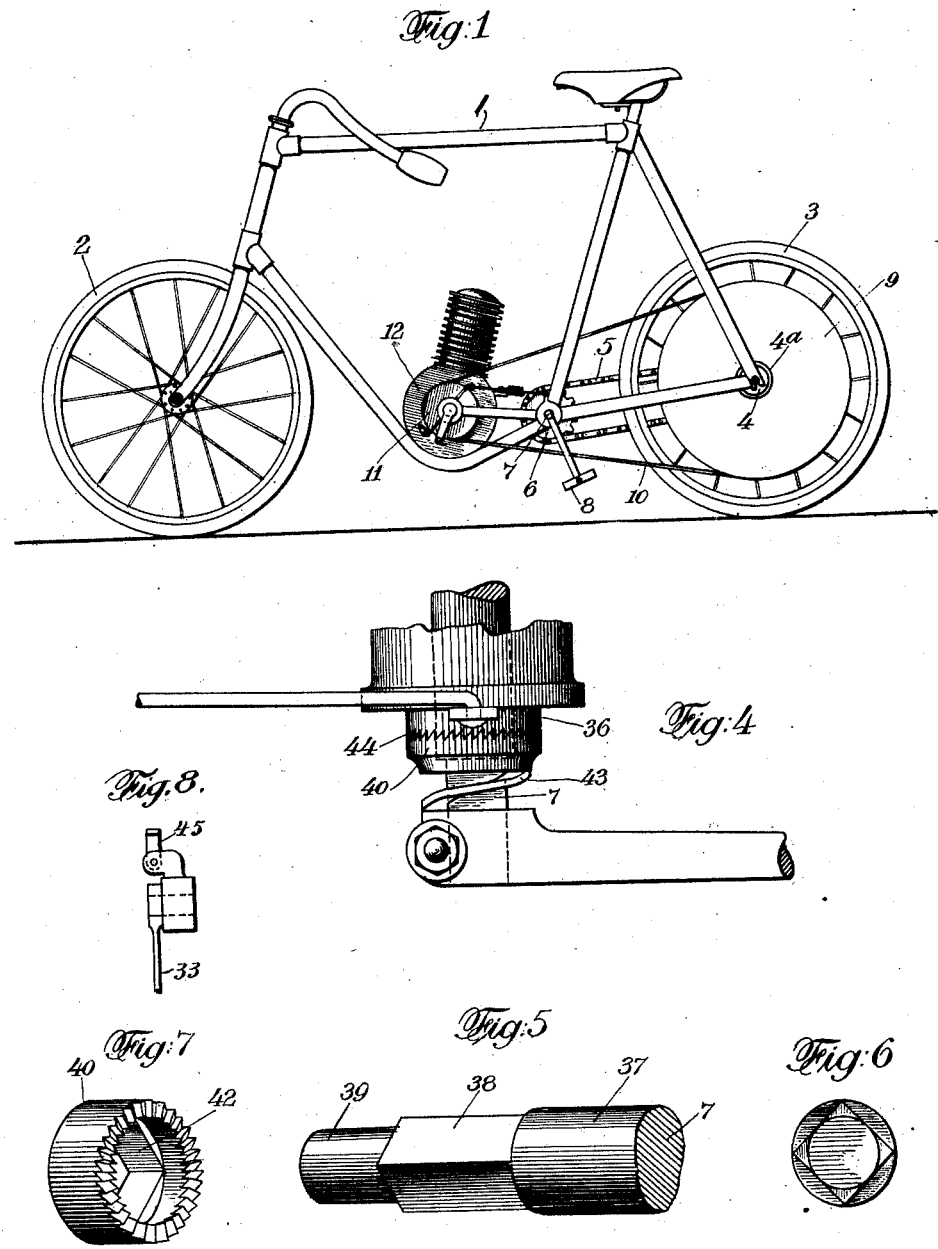

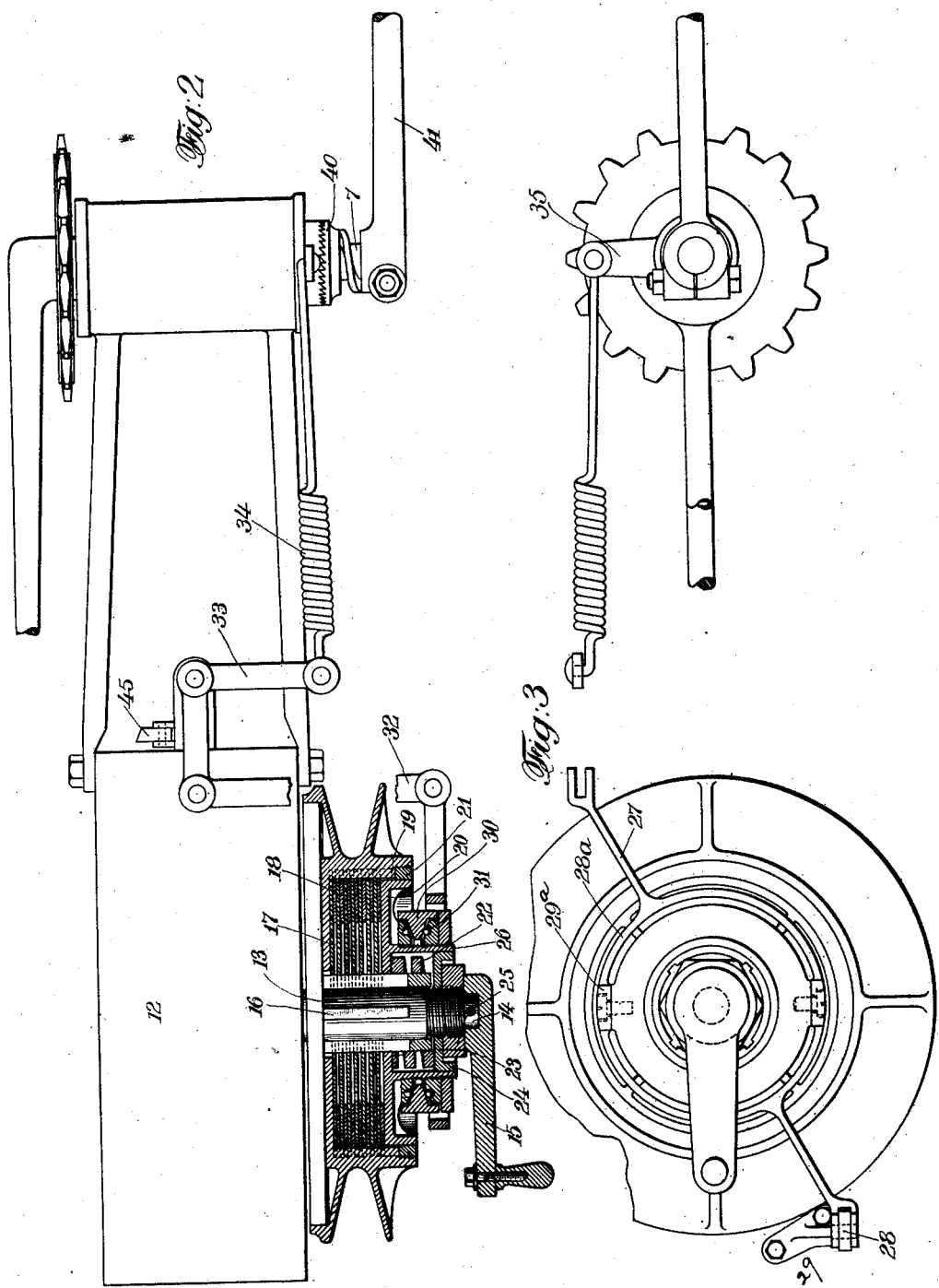

VEON IRWIN MONCRIEFF, OF KUTZTOWN, PENNSYLVANIA.

POWER-TRANSMISSION MECHANISM FOR MOTOR-CYCLES.

998,298.

Specification of Letters Patent. Patented July 18, 1911.

Application filed September 20, 1909. Serial No. 518,660.

*To all whom it may concern:*

Be it known that I, VEON IRWIN MONCRIEFF, of Kutztown, in the county of Berks and in the State of Pennsylvania, have invented a certain new and useful Improvement in Power-Transmission Mechanism for Motor-Cycles, and do hereby declare that the following is a full, clear, and exact description thereof.

My invention relates particularly to an improvement in power transmission mechanisms for motor cycles, and especially for motor cycles driven by means of an explosive motor.

The object of my invention is to provide a transmission mechanism of the above kind which will be more positive and certain in its operation and which may be readily controlled from the pedals.

I have shown one embodiment of my invention in the accompanying drawings, in which, Figure 1 is a side elevation of a motor cycle equipped with my invention; Fig. 2 is a plan view partly in section of certain details of my improvement; Fig. 3 is a side elevation of said details; Fig. 4 is a detail; Fig. 5 is a perspective view of the crank shaft; Fig. 6 is an end view of the same; Fig. 7 is a detail view of one of the sleeves supported by the crank shaft; and Fig. 8 is an end elevation of a pivoted catch for controlling the operation of one of the levers.

In the drawings, 1 is a motor cycle provided with front and rear wheels 2 and 3. The rear wheel carries a sprocket 4. The sprocket 4 is connected to the rear wheel 3 by means of a coaster-brake 4ª of the usual type. The sprocket 4 is also adapted to receive a chain 5 leading to a sprocket 6 carried by a crank shaft 7, to which is attached pedals 8. The rear wheel 3 also carries a pulley 9 on the opposite side from the side upon which the sprocket 4 is carried, which pulley 9 is connected by means of a band 10 to a pulley 11, situated upon an explosive motor 12. The pulley 11 is loosely carried upon a motor shaft 13, the end of which is squared at 14 to receive a detachable crank 15. The shaft 13 is provided with a number of splines 16, over which slide a series of friction disks 17. Alternating with the disks 17 there are provided a plurality of rings 18, said rings being splined by means of splines 19 to the interior of the pulley 11.

A spring-pressed ring 20 presses against the outermost ring 18, said ring 20 being supported peripherally by means of a removable ring 21 screw-threaded to the interior of the pulley 11. A spring 22 is provided upon the exterior of the shaft 13 for the purpose of normally pressing the spring-pressed ring 20 inwardly against the disks 17 and the ring 18. The spring 22 rests against an abutment 23, which is screw-threaded to the shaft 13 and is provided with an annular projection 24 to support the spring-pressed ring 20 at its center. A lock nut 25 is screwed against the face of the abutment 23 so as to hold it in its adjusted position. The spring-pressed ring 20 is provided with an annular extension 26, which rests upon the annular projection 24 attached to the abutment 23. A lever 27 pivoted at 28 to a stud 29 is provided for moving the ring 20 outwardly against the force of the spring 22, and thus throwing the clutch out of operation by relieving the pressure between the disks 17 and the rings 18. The lever 27 has an annular portion 28ª, which is connected by means of pins 29ª to a ring 30 supported in ball-bearings 31 screw-threaded to the outer face of the annular extension 26. A link 32 connects the free end of the lever 27 to one arm of the bell crank lever 33. The other arm of the bell crank lever 33 is connected by a spring 34 to an arm 35 carried upon a sleeve 36 loosely carried by the crank shaft 7. The crank shaft 7, as shown in Fig. 5, has a cylindrical portion 37, a squared portion 38 of smaller size than said cylindrical portion 37, and a cylindrical portion 39 of a smaller size than the squared portion 38. The cylindrical portion 37 carries the sleeve 36. The squared portion 38 carries another sleeve 40, and the cylindrical portion 39 is provided for receiving a crank hanger 41, which carries one of the pedals 8. The sleeve 40 is squared at 42 upon its inner face so as to fit upon the squared portion 38. A spring 43 is also carried by the shaft 7 so as to normally press the sleeves 36 and 40 together, and the adjacent faces of said sleeves are provided with interlocking teeth 44, so that when the pedals are moved backwardly said sleeves engage each other. A pivoted catch 45 is supported upon the motor 12 adjacent to one arm of the bell crank lever 33 in such a position that it may be moved against said arm of the bell crank lever so as to withdraw the spring-pressed ring 20 from against the disks 17 and rings 18.

In the operation of the device, the motor may be started in either one of two ways. According to one method, the pedals may be driven forwardly by the rider, thereby turning the rear wheel 3 and conveying power by means of the belt 10 to the pulley 11 attached to the motor shaft 13. According to the other method, the motor may be started by throwing the catch 45 into contact with the bell crank lever 33, thereby throwing the clutch upon the motor shaft 13 out of operation, and then cranking the shaft 13 of the motor by means of the detachable crank 15. After the motor has been started by this method, the catch 45 may be turned so as to move it away from the bell crank lever 33, thereby permitting the spring 22 to throw the clutch upon the motor shaft 13 into operation. During the operation of the motor 12 in driving the motor cycle forwardly, the power connections between the motor and the rear wheel 3 can be thrown out of operation at any time by a slight back pedaling pressure. The back pedaling results in causing the sleeves 36 and 40 to be connected with each other and the bell crank lever 33 to be moved so as to retract the spring 22. As a result, the pressure between the disks 17 and the rings 18 is relieved, thereby disconnecting the pulley 11 from the motor shaft 13. When the pulley 11 has thus become disconnected from the motor shaft 13, a further back pedaling movement will result in the spring 34 becoming extended and the coaster brake 4ª being thrown into operation.

While I have described my invention above in detail, I wish it to be understood that many changes might be made therein without departing from the spirit of my invention.

I claim:—

1. In a device of the character described, a vehicle, pedals attached thereto for controlling the same, a motor for driving the vehicle, a shaft upon which the motor is located, a clutch upon the motor shaft for operatively connecting the motor with the vehicle, and means for operating, said clutch from the pedals.

2. In a device of the character described, a vehicle, pedals attached thereto for controlling the same, a motor for driving the vehicle, a shaft upon which the motor is located, a clutch upon the motor shaft for operatively connecting the motor with the vehicle and means for disengaging the clutch and motor shaft by back pedaling.

3. In a device of the character described, a vehicle, pedals attached thereto for controlling the same, a motor for driving the vehicle, a shaft upon which the motor is located, a friction disk clutch upon the motor shaft for operatively connecting the motor with the vehicle, and means for operating, said clutch from the pedals.

4. In a device of the character described, a vehicle, pedals attached thereto for controlling the same, a motor for driving the vehicle, a shaft upon which the motor is located, a friction disk clutch upon the motor shaft for operatively connecting the motor with the vehicle and means for disengaging the clutch and motor shaft by back pedaling.

5. In a device of the character described, a vehicle, pedals attached thereto for controlling the same, a motor for driving the vehicle, a shaft upon which the motor is located, a clutch upon the motor shaft for operatively connecting the motor with the vehicle, a coaster brake, and means for operating, said clutch and coaster brake from the pedals.

6. In a device of the character described, a vehicle, pedals attached thereto for controlling the same, a motor for driving the vehicle, a shaft upon which the motor is located, a clutch upon the motor shaft for operatively connecting the motor with the vehicle, a coaster brake, and means for operating, said clutch and coaster brake from the pedals by back pedaling.

7. In a device of the character described, a vehicle, pedals attached thereto for controlling the same, a motor for driving the vehicle, said motor having a shaft, a clutch on the motor shaft for operatively connecting the motor with the vehicle, and means connecting the pedals with the clutch for operating the latter from the pedals.

8. In a device of the character described, a vehicle, pedals attached thereto for controlling the same, a motor for driving the vehicle, said motor having a shaft, a clutch on the motor shaft for operatively connecting the motor with the vehicle, and means connecting the pedals with the clutch for operating the latter from the pedals, comprising a clutch attached to the pedals and a lever and link connecting mechanism from said clutch to the clutch upon the motor shaft.

In testimony that I claim the foregoing I have hereunto set my hand.

VEON IRWIN MONCRIEFF.

Witnesses:
F. C. ANIONA,
JOHN W. RHODE.

Copies of this patent may be obtained for five cents each, by addressing the "Commissioner of Patents, Washington, D. C."